US008713196B1

(12) United States Patent
Gormley

(10) Patent No.: US 8,713,196 B1
(45) Date of Patent: *Apr. 29, 2014

(54) SYSTEMS FOR USAGE BASED RATE LIMITING OVER A SHARED DATA LINK

(75) Inventor: Eamonn Gormley, Redmond, WA (US)

(73) Assignee: Eden Rock Communications, LLC, Bothell, WA (US)

( * ) Notice: Subject to any disclaimer, the term of this patent is extended or adjusted under 35 U.S.C. 154(b) by 515 days.

This patent is subject to a terminal disclaimer.

(21) Appl. No.: 12/420,299

(22) Filed: Apr. 8, 2009

Related U.S. Application Data

(60) Provisional application No. 61/088,075, filed on Aug. 12, 2008.

(51) Int. Cl.
*G06F 15/173* (2006.01)

(52) U.S. Cl.
USPC ............................................ 709/235

(58) Field of Classification Search
None
See application file for complete search history.

(56) References Cited

U.S. PATENT DOCUMENTS

2004/0199635 A1 * 10/2004 Ta et al. .................. 709/226

OTHER PUBLICATIONS

Office Action for U.S. Appl. No. 12/420,320 dated Feb. 16, 2011.
Office Action for U.S. Appl. No. 12/420,320 dated Sep. 22, 2011.
Notice of Allowance for U.S. Appl. No. 12/420,320 dated Aug. 1, 2013.

* cited by examiner

*Primary Examiner* — Scott Christensen

(57) ABSTRACT

A data communications system includes a controller device and multiple client devices communicating with the controller device through a shared data communications link. The controller device is configured to determine a usage based multiplier value for each of the client devices and monitor the data communications link for congestion. When it is determined that a threshold congestion level has been exceeded, the controller applies a rate-limiting scheme, based on the determined usage based multiplier values, to reallocate client device bandwidth over the data communications link.

11 Claims, 7 Drawing Sheets

SYSTEMS FOR USAGE BASED RATE LIMITING OVER A SHARED DATA LINK

CROSS REFERENCE TO RELATED APPLICATIONS

The present application claims the benefit of U.S. Provisional Application No. 61/088,075, filed Aug. 12, 2008.

FIELD OF THE INVENTION

The present invention generally relates to systems for applying data rate-limiting schemes to users of a shared data communications link. The rate-limiting schemes are based on user-specific bandwidth consumption on a given communications link over a period of time and the schemes are implemented when it is determined that a congestion threshold has been exceeded.

BACKGROUND OF THE INVENTION

Broadband data communications links today are commonly shared by hundreds or thousands, if not millions, of independent users or user groups. Each of these user or user groups has their own specific bandwidth and usage requirements of a communications system. Unfortunately, in both wireline packet-based communications systems and wireless broadband communications systems, a majority of system bandwidth is often consumed by a small proportion of a system's total users. This can be due to the fact that heavy-users may continually be downloading large media data files (e.g., movies, music, eBooks, etc.) over a shared communications link with a larger number of light to moderate users who may only intermittently require access to much smaller media data files (e.g., websites, email, private service accounts, etc.). In this scenario, it would not be uncommon for up to 90% of a communication system's bandwidth to be consumed by as little as 10% of the system's users.

This disproportionate usage of bandwidth can cause a communications system's average per-user throughput to be significantly reduced. System average throughput may be defined as the sum of the data rates that are delivered to all users in a networked data communications system divided by the number of users. Decreased per-user throughput is most often affiliated with a state of network congestion, which can negatively impact several important quality of service (QOS) metrics, including delayed queuing, data loss, dropping existing connections, blocking new connections, etc.

QOS relates to a data communications system's ability to provide users or data flows on a shared data communications link a guarantee of a certain level of performance associated with the various QOS metrics. For example, a predetermined data transfer rate, queuing delay, or connection stability may be identified as specific QOS guarantees. These guarantees are very important for many modern data communications media, such as for real-time streaming audiovisual data, voice-over IP data, cellular communication data, etc., since this sensitive media content may require certain QOS guarantees to function properly.

In many data communication systems today users acquire service by paying flat rate fees. In these systems bandwidth allocation for a specific user is typically based on that user's bandwidth consumption profile, which is evaluated independently from any other user on the same data communications link. In these systems, a network operator may limit the amount of bandwidth consumed by the system's heaviest users, simply by reducing those user's data transfer rates for a set period of time. This bandwidth allocation scheme is typically implemented when an individual user's allowed bandwidth consumption has been exceeded. Although this solution may allow for more users to transfer data using the same data communication link, it does not ensure full usage of the communications system's bandwidth at all times. Further, this allocation scheme does not give specialized priority to the system's lightest users, who should be rewarded for their bandwidth conservation with the highest possible data rate access.

Therefore, there continues to be a need for improved data communications systems that can selectively apply more efficient rate-limiting schemes that offer a better overall user experience for the collective users of a shared data communications link.

SUMMARY OF THE INVENTION

In overcoming the above disadvantages associated with modern data communication systems, a data communications system in accordance with the present invention includes, but is not limited to, a controller device and multiple client devices communicating with the controller device through a shared data communications link. The controller device is configured to determine a usage based multiplier value for each of the client devices and monitor the data communications link for congestion. The controller is further configured to apply a rate-limiting scheme based on the determined usage based multiplier values when a congestion threshold is exceeded.

In accordance with an aspect of the invention, the application of the rate-limiting scheme includes determining a product of the usage based multiplier value and a peak information rate for each of the client devices.

In accordance with a further aspect of the invention, the controller device is further configured to allocate spare bandwidth on the data communications link to the client devices after the rate-limiting scheme has been applied.

In accordance with another aspect of the invention, spare bandwidth is only allocated to client devices transferring data at a rate below their peak information rate.

In accordance with yet another aspect of the invention, while spare bandwidth exists on the data communications link, the spare bandwidth is allocated to the client devices sequentially, in accordance with the magnitude of their usage based multiplier values.

In accordance with a further aspect of the invention, when it is determined that a client device in a sequence of client devices cannot be set to its maximum data transfer rate, the client device and a remainder of client devices in the sequence are allocated any spare bandwidth on the data communications link in proportion to a magnitude of their usage based multiplier and their peak information rate products.

In accordance with yet another aspect of the invention, the client devices may comprise either wireless device or a wireline device that communicates with the controller device through a data communications link.

DESCRIPTION OF THE DRAWINGS

Preferred and alternative examples of the present invention are described in detail below with reference to the following Figure drawings.

DETAILED DESCRIPTION

Figure 1:
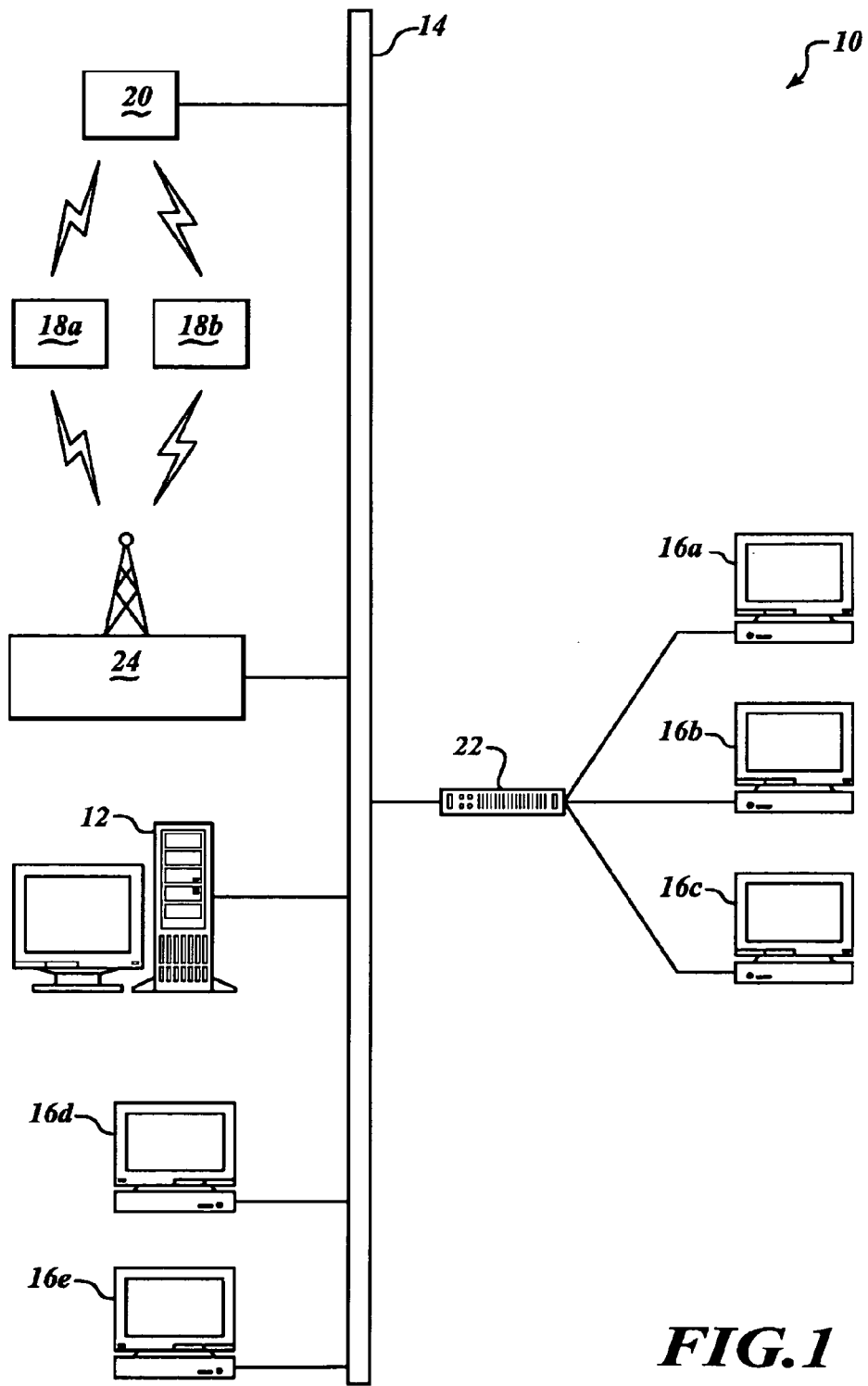
FIG. 1 illustrates a communications system in accordance with an embodiment of the present invention.

In accordance with an exemplary embodiment of the present invention, FIG. 1 illustrates a distributed computing system 10 comprised of various wireline and wireless computing devices. The distributed computing system 10 may include, but is not limited to, a server computer 12, various wireline client computing devices 16(a-e), a transceiver communications device 20 and a communications basestation 24 that can each control communications with wireless computing devices 18(a-b) within the distributed computing system 10, a router/switch device 22 that can control data communications between the server 12 and the client computing devices 16(a-c), a wireline network 14, and various wireless client computing devices 18(a-b). The server 12, communications basestation 24, and client 16(a-e), 18(a-b) computing devices may be configured to run various operating systems, including but not limited to, Microsoft Windows™, Mac OS™, Linux™, and Unix™ based operating systems. The system computers 12, 16(a-e), 18(a-b), 20, 22, and 24 may also each be configured to communicate with each other using any suitable network communications technology known in the art, such as wireline or wireless LAN, WAN, GAN, SAN, and VPN networks, including the Internet.

In an embodiment, the wireline network 14 may include, but is not limited to, any of the following communications technologies: optical fiber, coaxial cable, twisted pair cable, Ethernet cable, and power line cable. In an embodiment, the transceiver communications device 20, the communications base station 24, and the wireless client computing devices 18(a-b) may include, but are not limited to, any of the following wireless communications technologies: radio frequency communication, microwave frequency communication, infrared communication, including cellular, Wi-Fi, and satellite communications.

The server computer 12 may communicate with each of the client computing devices 16(a-e), 18(a-b), directly or indirectly, through the wireline network 14 (with or without use of the router/switch device 22) and/or wirelessly through the transceiver communications device 20 or the communications basestation 24. In an embodiment, the transceiver communications device 20 may be built into the server computer 12, such that the server computer may communicate directly with the wireless client computing devices 18(a-b) using various wireless communications technologies. The server computer 12, transceiver communications device 20, communications basestation 24, router/switch device 22, and client 16(a-e), 18(a-b) computers may also include standard computing software and hardware necessary for processing, storing, displaying, manipulating, and communicating data with each other within the distributed computing system 10. The computing hardware may include, but is not limited to, one or more processors, volatile and non-volatile memories, displays, user input devices, and communications ports.

In an embodiment, a controller device, which could be any one of the server computer 12, transceiver communications device 20, communications basestation 24, or router/switch device 22, may include a computer-readable medium encoded with a set of computer readable instructions, which when executed 12, performs one or more data flow control processes. These control processes may facilitate the controller device's monitoring and management of data communications to and from the client computers 16(a-e), 18(a-b) across various communication links within the distributed computing system 10. Some of the data flow control processes include usage-based data rate-limiting schemes.

These rate-limiting schemes can facilitate gradual slow-down in throughput for moderate-usage client devices, such that a user on the borderline of being considered a heavy user or a light user may have lesser rate-limiting applied than the rate-limiting that would be applied for a heavy user. The rate-limiting schemes can also facilitate a dynamically configurable rate of slow-down or speed-up. An operator of the controller device (e.g., server computer 12) may make real-time decisions about what is considered heavy usage and how quickly the heavy usage users should have their access rate limited. In an embodiment, usage based rate-limiting is applied only during periods of congestion such that if no congestion is detected on a shared data communications link, a heavy user will not be rate limited and every user of the shared link will still be able to achieve their maximum throughput. Further, during periods of congestion, light users may receive proportionally greater throughput than heavier users. This usage-based bandwidth allocation improves the quality of experience for the majority of users of the distributed computing system 10.

In accordance with an embodiment of the present invention, each data flow on a data communications link in the distributed computing system 10 is assigned a Usage Based Throughput Multiplier (UBTM) value, which may be a value between 0.0 and 1.0 with any level of decimal precision necessary to accommodate accurate data rate differentiation between the many different users of the distributed computing system 10. In an embodiment, a data flow may be considered to be a single logical data communications connection between any two computers on a shared data communications link. A data communications link can carry information pertaining to multiple users' data flows. Each data flow has associated quality of service metrics, which can include, but are not limited to, maximum throughput, transfer rate, latency, queuing delay, connection stability, etc.

In an embodiment, for low use data flows the UBTM value may be set to a value of 1.0 or a value as close to 1.0 as possible. High use data flows have UBTM values that may be gradually decreased to a value as low as 0.1 or below. If it is desired to halt the traffic on high usage data flows, in order to accommodate the addition of several new data flows, then the UBTM of the highest use data flows may be set to a value close to or equal to 0.0. As the traffic on a high usage flow decreases then the UBTM may be gradually increased to a higher UBTM value. A UBTM value may be used as a multiplier when determining a throughput to assign to each data flow on a data communications link during times of congestion. The actual throughput achieved by each data flow is proportionate with the maximum configured throughput for each data flow and the data flow's present UBTM value.

In various embodiments of the invention, a UBTM value may be applied in conjunction with packet-based data scheduling schemes. Data flows on a data communications link may be rate-limited to a Peak Information Rate (PIR) via a token-bucket rate limiting scheme. In a token-bucket scheme, a counter that may indicate the maximum amount of data that can be sent on a data flow can be periodically incremented at a fixed rate. The counter may be decremented in accordance with an amount of actual data sent on a data flow. If an amount of data to be sent is greater than allowed, based on the counter value, then no data is sent on the service flow until the counter value becomes large enough to permit the data to be sent. During periods of congestion, the amount that a token bucket is incremented may be multiplied by the UBTM value.

In various embodiments, UBTM values can also be used in conjunction with a family of scheduling schemes known as proportional fair sharing (PFS) schemes. PFS schemes may be deployed in wireless networks as a way of sharing limited bandwidth in a proportionately "fair" manner. Each of the data flows on a shared communications link has an associated cost per data bit value that is used to determine when to schedule data transfer on a particular data flow. Using PFS, UBTM values can be used to modify the cost per bit values of high usage service flows. In this case the cost per bit may be divided by the UBTM so that high usage service flows have a higher cost and hence will achieve poorer throughput during periods of congestion. Equivalently, the UBTM can be redefined to be a value greater than 1.0 (e.g., a value between 1 and 10) that is incremented for service flows with greater usage and decremented for service flows with lower usage. In this scenario the UBTM may be multiplied by the cost per bit value in a PFS scheduling scheme during times of congestion.

In data networking and queuing theory, network congestion can occur when a communications link is carrying so much data that its QOS deteriorates beyond a QOS threshold. Typical effects can include queuing delay, data loss, and dropping or blocking of network connections. There are several ways in which it can be determined if a data communications link is congested. Some examples may include, but are not limited to, the following example detection methods: 1) Monitor queuing delay for all data flows; If the queuing delay exceeds QOS settings for queuing delay on a certain percentage of data flow service queues, then a congestion state is detected; 2) Monitor the total amount of data residing in the data flow service queues; If the amount of data exceeds QOS threshold, then a congestion state is detected; and 3) Monitor the amount of bandwidth consumed by the data on the link for a period of time. If the amount of bandwidth consumed is above a threshold then a congestion state is detected.

The detection of congestion may include some hysteresis such that switching between times of congestion and non-congestion will not take place too abruptly. The hysteresis may be implemented by using a timer, so that it may take several seconds or 10's of seconds to switch back from a congestion state to a non-congestion state.

Figure 2:
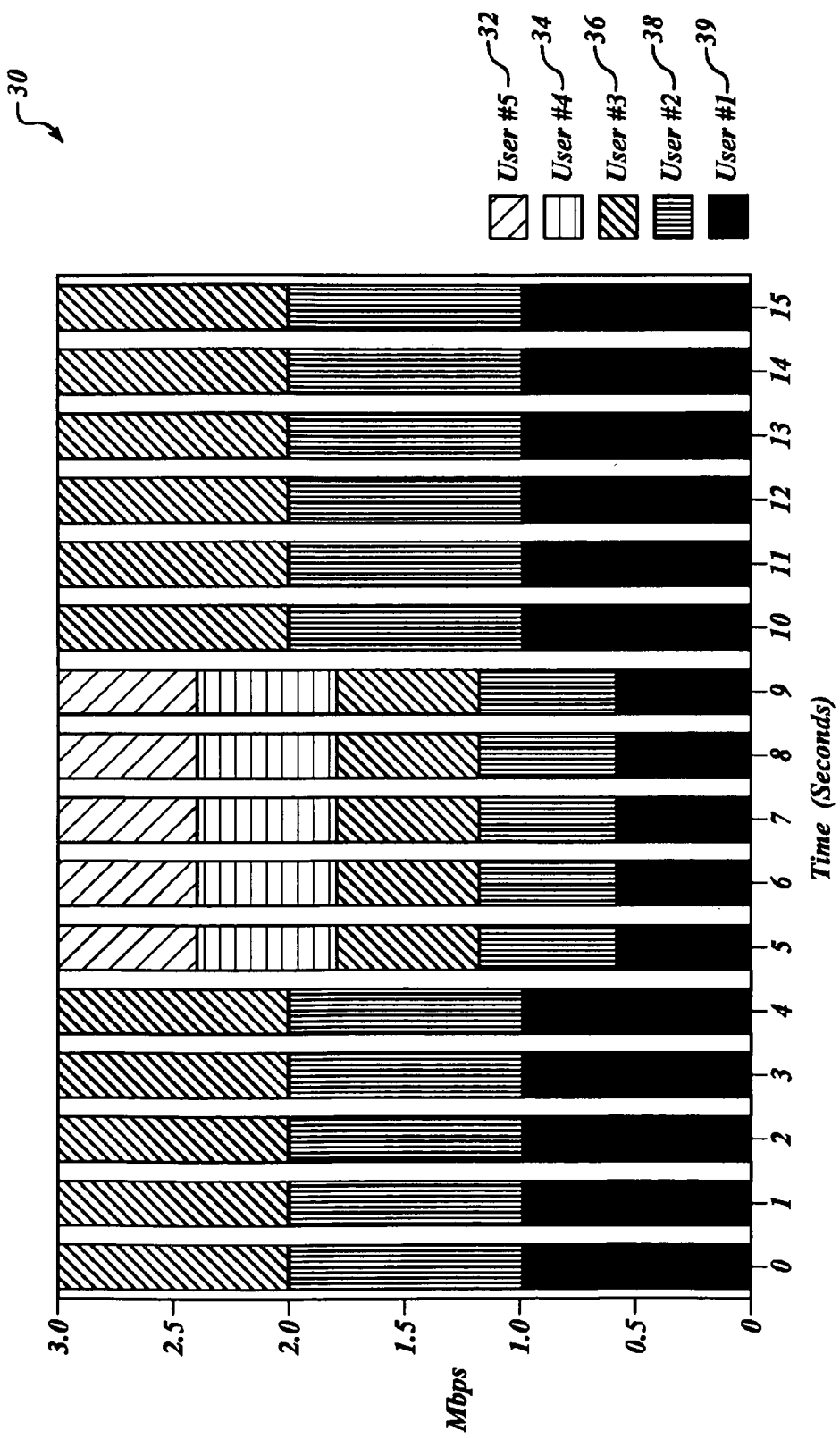
FIG. 2 illustrates a data link bandwidth plot in accordance with an embodiment of the present invention.

In accordance with an embodiment of the invention, FIG. 2 illustrates a bandwidth allocation plot 30 of a shared data communications link as a function of user-specific data transfer rates (Mbps) over time (seconds). The maximum data link transfer rate is 3 Mbps and the time period over which the plot 30 is displayed is between 0 to 15 seconds. There are 5 users on the link, 32, 34, 36, 38, and 39 who each have a PIR of 1 Mbps. Between times t=0 to t=5, users #1 (39), #2 (38), and #3 (36), each transfer data at their maximum data transfer rate of 1 Mbps and have equal UBTM values of 1.0. At time t=5, users #4 (34) and #5 (32) simultaneously initiate the transfer of 3 Mbit files. Between times t=5 to t=9, all users share the channel bandwidth equally, each achieving a throughput of 0.6 Mbps. Under this scenario it takes 5 seconds to transfer the 3 Mbit files of users #4 (34) and #5 (32).

Figure 3:
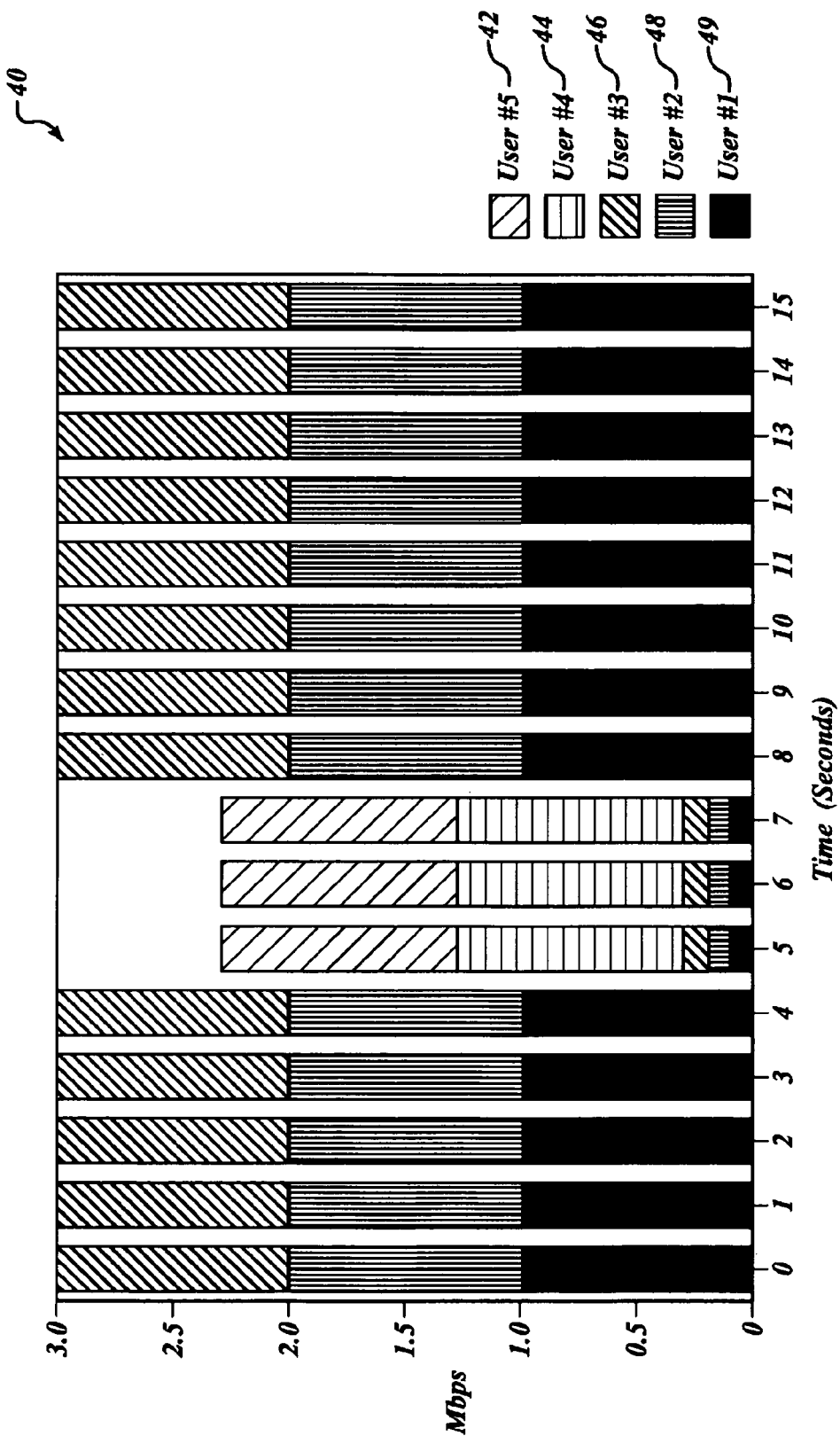
FIG. 3 illustrates a data link bandwidth plot in accordance with an embodiment of the present invention.

FIG. 3 illustrates a bandwidth allocation plot 40 of a shared data communications link in accordance with another embodiment of the invention. There are 5 users on the link, 42, 44, 46, 48, and 49 who each have a PIR of 1 Mbps. In line with the same scenario described above for FIG. 2, at time t=5 users #4 (44) and #5 (42) initiate the transfer of 3 Mbit files. In accordance with another data-rate limiting scheme, users #4 (44) and #5 (42) are determined to be light users and their data transfer rates are set to their PIR of 1 Mbps with a UBTM value of 1.0. In contrast, users #1 (49), #2 (48), and #3 (46) are determined to be heavy users because they previously operated at their PIR of 1 Mpbs between times t=0 to t=5. In accordance with the data-rate limiting scheme, the data transfer rates for users #1 (49), #2 (48), and #3 (46) are set to a rate of 0.1 Mbps between times t=5 to t=7, with UBTM values of 0.1. Between times t=5 to t=7, channel bandwidth is distributed unequally, such that light and heavy users have different throughputs based on their bandwidth consumption history on the data communications link. Under this scenario, it takes 3 seconds to transfer the 3 Mbit files of users #4 (44) and #5 (42) and there is 0.7 Mbps of spare bandwidth between times t=5 to t=7.

Figure 4:
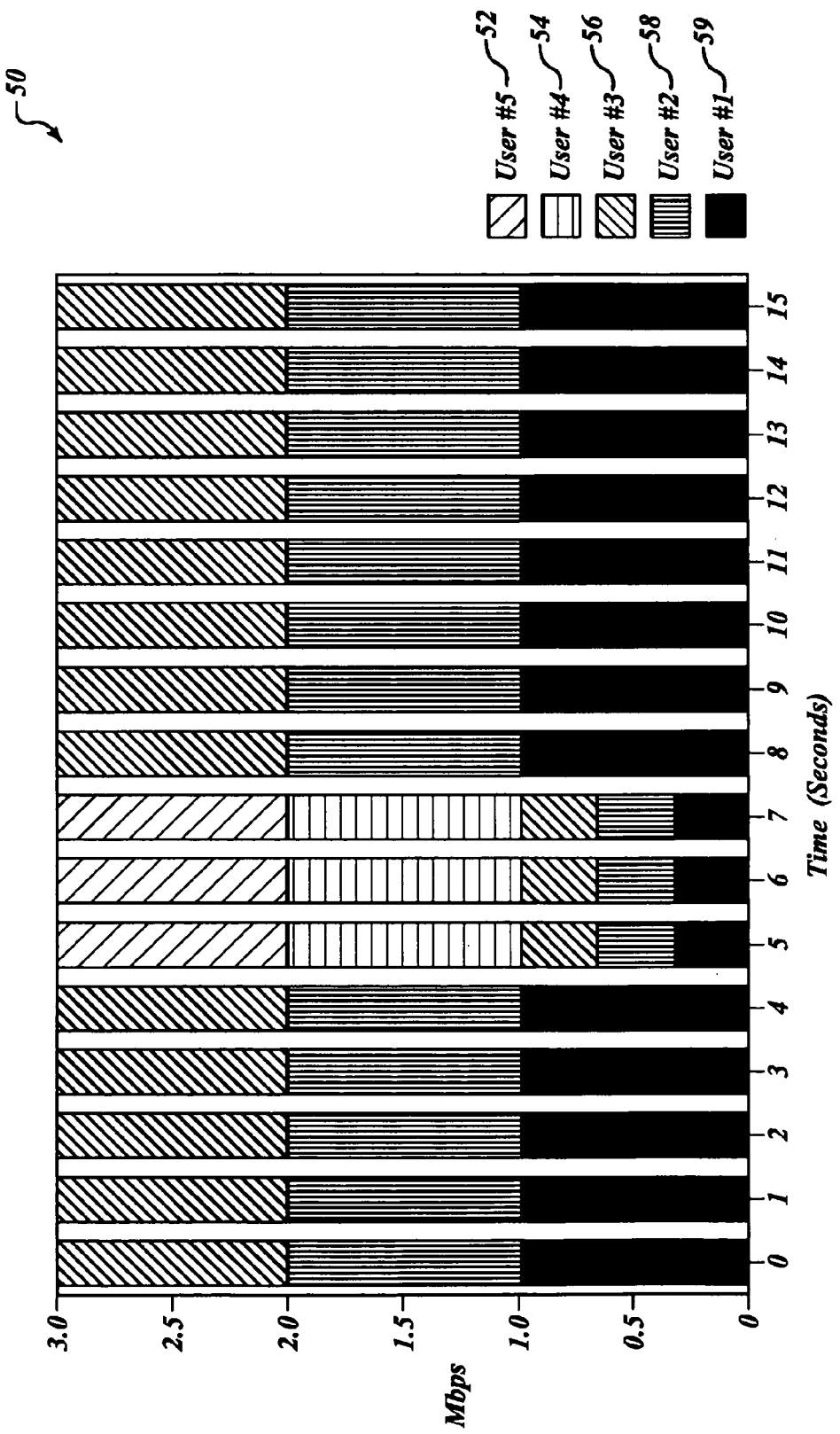
FIG. 4 illustrates a data link bandwidth plot in accordance with an embodiment of the present invention.

FIG. 4 illustrates a bandwidth allocation plot 50 of a shared data communications link in accordance with another embodiment of the invention. There are 5 users on the link, 52, 54, 56, 58, and 59 who each have a PIR of 1 Mbps. In line with the same scenario described above for FIG. 3, at time t=5 users #4 (54) and #5 (52) initiate the transfer of 3 Mbit files. Similar to the data-rate limiting scheme of FIG. 3, users #4 (54) and #5 (52) are determined to be light users and users #1 (59), #2 (58), and #3 (56) are determined to be heavy users. To eliminate the wasted 0.7 Mbps of spare bandwidth between times t=5 to t=7, the remaining bandwidth is allocated to users #1 (59), #2 (58), and #3 (56) in accordance with their PIR× UBTM products. In this scenario between times t=5 to t=7, each of users #1 (59), #2 (58), and #3 (56) are set to a data transfer rate of 0.33 Mbps, such that the full bandwidth of the data communications link is always being utilized.

Figure 5:
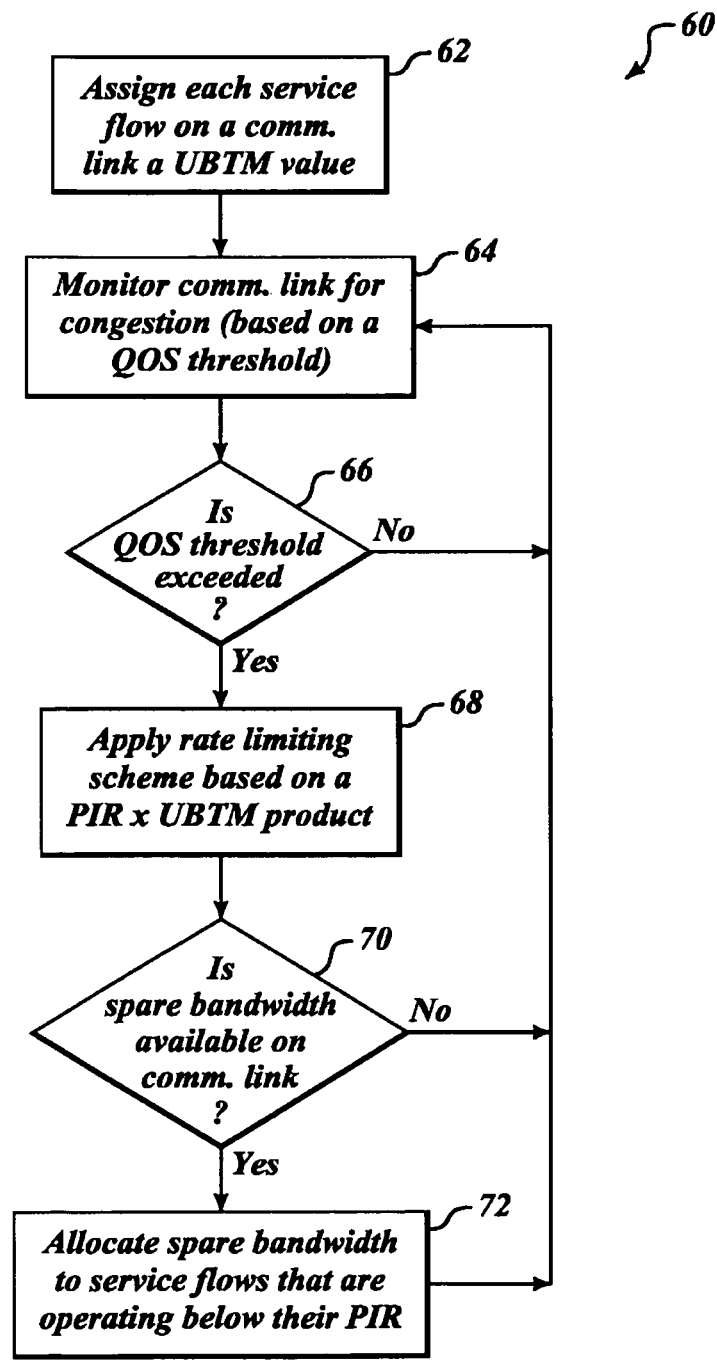
FIG. 5 illustrates a flowchart of a data link bandwidth allocation process in accordance with an embodiment of the present invention.

FIG. 5 illustrates a flowchart 60 of a data communications link bandwidth allocation process in accordance with an embodiment of the present invention. In accordance with an embodiment a controller device having a computer-readable medium encoded with a set of computer readable instructions related to the bandwidth allocation flowchart process 60, may perform the process steps, when the instructions are executed by the controller device. The process steps include, but are not limited to, the following steps: at block 62 each data or service flow (the terms "data flow" and "service flow" are to be used interchangeably) on a data communications link is assigned a UBTM value; next at block 64, the communications link is monitored for congestion based on a QOS threshold; it is then determined at block 66 whether the monitored QOS threshold has been exceeded (if at block 66, it is determined that a QOS threshold has not been exceeded, the data communications link is again monitored for congestion at block 64; if at block 66, it is determined that a QOS threshold has been exceeded, then the flow moves on to block 68); at block 68 a rate limiting scheme that is based on a PIR×UBTM product is applied to each service flow on the communications link. After the rate-limiting scheme has been applied, at block 70 it is determined if there is spare bandwidth available on the communications link (if at block 70, it is determined that spare bandwidth is not available on the communications link, the link is again monitored for congestion at block 64; if at block 70, it is determined that spare bandwidth exists on the communications link, then the flow moves on to block 72). At block 72 any spare bandwidth on the communications link is allocated to service flows that are operating below their PIR.

Figure 6:
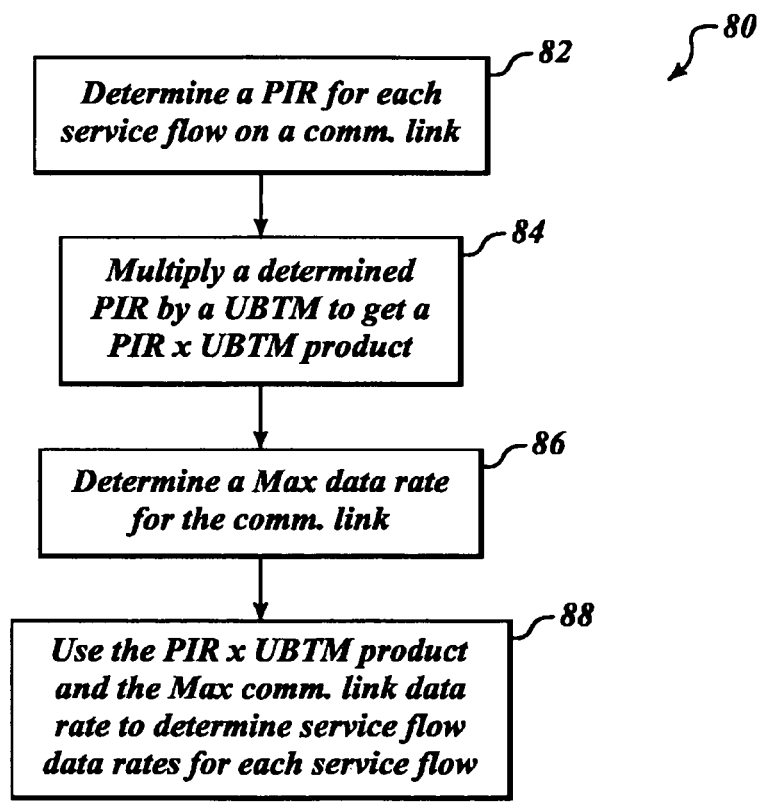
FIG. 6 illustrates a flowchart of a rate-limiting scheme in accordance with an embodiment of the present invention.

FIG. 6 illustrates a flowchart 80 of a rate-limiting scheme in accordance with an embodiment of the present invention. In accordance with an embodiment a controller device having a computer-readable medium encoded with a set of computer readable instructions related to the rate-limiting scheme flowchart process 80, may perform the process steps when the instructions are executed by the controller device. The process steps include, but are not limited to, the following steps: at block 82 a PIR is determined for each service flow on a data communications link; next at block 84 the determined PIR is multiplied by an assigned UBTM value for each service flow to determine a PIR×UBTM product for every flow on the link; then at block 86 a maximum data rate for the communications link is determined; and finally at block 88 the PIR×UBTM products and the maximum link data rate are used to determined the service flow data rates for each service flow on the data communications link.

Figure 7:
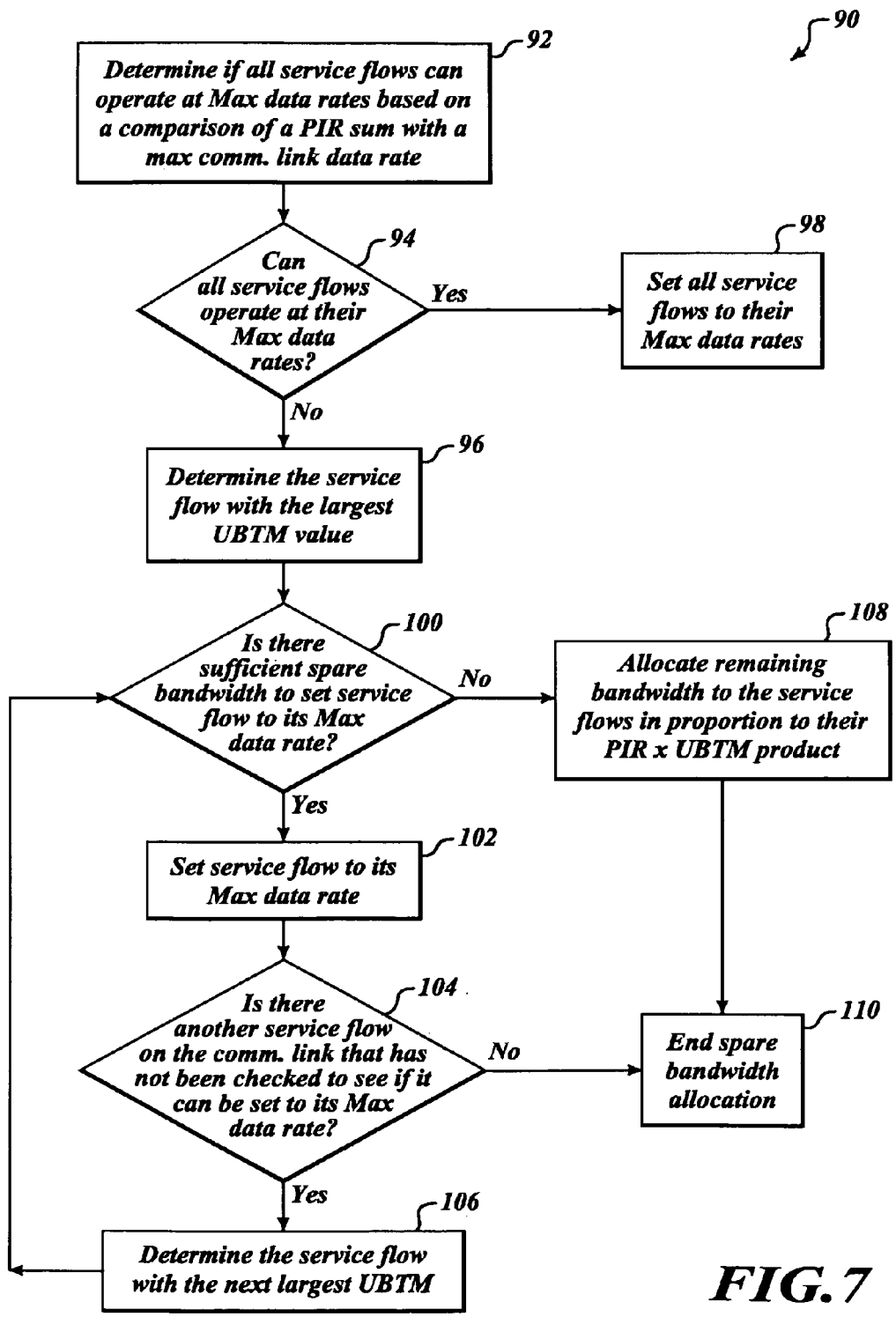
FIG. 7 illustrates a flowchart of a spare bandwidth allocation process in accordance with an embodiment of the present invention.

FIG. 7 illustrates a flowchart 90 of a spare bandwidth allocation process in accordance with an embodiment of the present invention. In accordance with an embodiment a controller device having a computer-readable medium encoded with a set of computer readable instructions related to the spare bandwidth allocation process 90, may perform the process steps when the instructions are executed by the controller device. The process steps include, but are not limited to, the following steps: at block 92 it is determined if all service flows on a data communications link can operate at their maximum data rates based on a comparison of a PIR sum with a maximum data communication link data rate; at block 94, if the comparison results indicate that all service flows can operate at their maximum data rates, then at block 98 all service flows are set to their maximum data rates, whereas if the results indicate that all service flows cannot operate at their maximum data rates, then the process moves on to block 96; at block 96 the service flow with the largest UBTM value is determined; at block 100 it is determined if there is sufficient spare bandwidth on the data communications link to set the service flow to its maximum data rate (it there sufficient bandwidth the process moves on to block 102, and if there is not, the process moves on to block 108); at block 102 the service flow with the largest UBTM value is set to its maximum data rate; next, at block 104 it is determined if there is another service flow on the communications link that has not been checked to see if it can be set to its maximum data rate (if there are no more unchecked service flows, the spare bandwidth allocation ends at block 110, however is there are unchecked service flows, the process moves on to block 106); at block 106 the service flow with the next largest UBTM value is determined and the process returns to block 100 to see if the is sufficient spare bandwidth to set that service flow to its max data rate; at block 108, when it is determined that there is insufficient spare bandwidth to set any more service flows to their maximum data rate, the remaining bandwidth of the data communications link is distributed amongst all service flows in proportion to their PIR×UBTM products; after all bandwidth is allocated to the service flows at block 108, the spare bandwidth allocation process ends at block 110.

In accordance with an embodiment of the present invention, when service flows on a data communications link have a variety of different PIR and UBTM values, rate-limiting schemes may become more complicated. The following rule can allow for the derivation of a procedure for proportionally fair allocation of the spare bandwidth on a data communications link to the service flows: Flows that are not achieving their PIR data rates should be rate limited in proportion to the product of their PIR and their UBTM values.

By way of example, consider the two service flows, A and B, with the following UBTM and PIR values: A: PIR=1.5 Mbps, UBTM=0.8, PIR×UBTM=1.2; and B: PIR=1.0 Mbps, UBTM=0.6, PIR×UBTM=0.6. The product of the PIR and UBTM for service flow A is 1.2 and the product of the PIR and UBTM for service flow B is 0.6. If these two service flows are sharing a 1 Mbps link, then flow A should have a rate of 1 Mbps*1.2/(0.6+1.2)=0.667 Mbps and flow B should have a rate of 1 Mbps*0.6/(0.6+1.2)=0.333 Mbps.

By way of example, the following computer program code in Table 1 provides a reference algorithm for calculating the actual rates from the PIR and UBTM values for each service flow in an efficient manner. Starting with the service flow having the largest UBTM value, the executed program checks each service flow in turn to see if there is sufficient remaining bandwidth to allow that flow to operate at its maximum data rate with all remaining flows operating at data rates proportional to their PIR×UBTM products. If there is enough bandwidth, then the actual data rate for that service flow is set to its maximum value and the remaining bandwidth amount is decremented by the rate of that service flow. The process is repeated for the next service flow. If a check determines that there is not sufficient bandwidth then any remaining bandwidth is allocated to the service flows in a manner proportional to their PIR×UBTM products.

In an embodiment, the computer executable code of Table 1 is written in the python programming language. By way of example, this code depicts one possible implementation of a data communications link bandwidth allocation process of the present invention.

TABLE 1

```
def calcRates(ubtm, pir, maxRate):
    # ubtm is a sorted list of the current UBTMs for each service flow
    # pir is a list with the configured peak information rate for each service flow
    # maxRate is the maximum rate at which data can be sent over the link
    # Check if all the service flows can be carried at their MAX PIRs
    if sum(pir) <= maxRate:
        return pir
    actualRates = [0] * len(ubtm) # creates a list, each element set to 0,
                                   # with same length as input ubtm list.
    # Calculate the total throughput if all flows are rate limited with the usage
    # based rate limiting factor
    tputs = 0
    for idx in range(0, len(ubtm)):
        tputs += ubtm[idx] * pir[idx]
    remBW = maxRate
    idx = 0
    # Starting with the least used flow, max out all flows until no more can be maxed out
```

TABLE 1-continued

```
    while (tputs/ubtm[idx] < remBW):
        remBW -= pir[idx]         # Decrement remaining bandwidth by the current PIR
        tputs -= ubtm[idx] * pir[idx] # Remaing throughputs decremented by product of
                                  # of current UBTM and current PIR
        actualRates[idx] = pir[idx]   # Actual rate of current flow set to its peak rate
        idx += 1
    # No more flows can be maxed out. Allocate bandwidth to remaining flows in the ratio
    # of the product of their UBTM and PIR
    m = remBW/tputs               # Multiplier used to fit remaining flows into
                                  # remaining bandwidth.
    for ridx in range(idx, len(ubtm)):
    actualRates[ridx] = ubtm[ridx] * m * pir[ridx]
return actualRates
```

In various embodiments of the present invention, Tables 2-10, represent the results of running the above computer program code of Table 1 on various shared data communications link scenarios. In each case the service flow PIR and UBTM values were passed to the program code to calculate the actual data communications rates. The PIR, UBTM, and actual data rate for each flow is displayed in the tables, along with the sum of the actual rates.

Scenario #1: With reference to Table 2, there are four service flows with a rate of 1 Mbps sharing a link with a capacity of 3 Mbps. The flows with the higher UBTM can transmit more data on the link. The flows with the lower UBTM end up transmitting at half the rate of the flows with the higher UBTMs.

TABLE 2

Link Throughput = 3.000000
Flow PIR = 1.000000, UBTM = 1.000000, Actual Rate = 1.000000
Flow PIR = 1.000000, UBTM = 1.000000, Actual Rate = 1.000000
Flow PIR = 1.000000, UBTM = 0.100000, Actual Rate = 0.500000
Flow PIR = 1.000000, UBTM = 0.100000, Actual Rate = 0.500000
Total of actual rates = 3.000000

Scenario #2: With reference to Table 3, this scenario shows the case where the link throughput is high enough to carry data from all service flows at their PIRs.

TABLE 3

Link Throughput = 5.000000
Flow PIR = 1.000000, UBTM = 1.000000, Actual Rate = 1.000000
Flow PIR = 1.000000, UBTM = 1.000000, Actual Rate = 1.000000
Flow PIR = 1.000000, UBTM = 0.100000, Actual Rate = 1.000000
Flow PIR = 1.000000, UBTM = 0.100000, Actual Rate = 1.000000
Total of actual rates = 4.000000

Scenario #3: With reference to Table 4, this scenario shows the case where the link throughput is not high enough to carry data from all service flows, even if the usage flows are limited by the usage based rate limiting factor. Here the bandwidth is shared in proportion to the UBTM for each flow.

TABLE 4

Link Throughput = 2.000000
Flow PIR = 1.000000, UBTM = 1.000000, Actual Rate = 0.909091
Flow PIR = 1.000000, UBTM = 1.000000, Actual Rate = 0.909091
Flow PIR = 1.000000, UBTM = 0.100000, Actual Rate = 0.090909
Flow PIR = 1.000000, UBTM = 0.100000, Actual Rate = 0.090909
Total of actual rates = 2.000000

Scenario #4: With reference to Table 5, this scenario shows how the link is shared when there are service flows with many different UBTM values. The service flows with the highest UBTM values can send data at their PIRs. The service flows with the lowest UBTMs send data in proportion to their UBTM.

TABLE 5

Link Throughput = 4.000000
Flow PIR = 1.000000, UBTM = 1.000000, Actual Rate = 1.000000
Flow PIR = 1.000000, UBTM = 0.900000, Actual Rate = 1.000000
Flow PIR = 1.000000, UBTM = 0.800000, Actual Rate = 1.000000
Flow PIR = 1.000000, UBTM = 0.200000, Actual Rate = 0.666667
Flow PIR = 1.000000, UBTM = 0.100000, Actual Rate = 0.333333
Total of actual rates = 4.000000

Scenario #5: With reference to Table 6, this scenario is the same as scenario 4, but with a lower link throughput. The sum of the UBTM values in this case is the same as the link throughput. All the service flows are allocated bandwidth in proportion to their UBTM values.

TABLE 6

Link Throughput = 3.000000
Flow PIR = 1.000000, UBTM = 1.000000, Actual Rate = 1.000000
Flow PIR = 1.000000, UBTM = 0.900000, Actual Rate = 0.900000
Flow PIR = 1.000000, UBTM = 0.800000, Actual Rate = 0.800000
Flow PIR = 1.000000, UBTM = 0.200000, Actual Rate = 0.200000
Flow PIR = 1.000000, UBTM = 0.100000, Actual Rate = 0.100000
Total of actual rates = 3.000000

Scenario #6: With reference to Table 7, this scenario is the same as scenario 5, but with the maximum UBTM value of any flow set to 0.9. In this case the link is shared in proportion to the UBTM values.

TABLE 7

Link Throughput = 3.000000
Flow PIR = 1.000000, UBTM = 0.900000, Actual Rate = 0.931034
Flow PIR = 1.000000, UBTM = 0.900000, Actual Rate = 0.931034
Flow PIR = 1.000000, UBTM = 0.800000, Actual Rate = 0.827586
Flow PIR = 1.000000, UBTM = 0.200000, Actual Rate = 0.206897
Flow PIR = 1.000000, UBTM = 0.100000, Actual Rate = 0.103448
Total of actual rates = 3.000000

Scenario #7: With reference to Table 8, in this scenario, the PIR for two of the flows is increased. The link is shared in proportion to the products of the PIR and the UBTM of each service flow.

TABLE 8

Link Throughput = 3.000000
Flow PIR = 1.000000, UBTM = 0.900000, Actual Rate = 0.760563
Flow PIR = 1.500000, UBTM = 0.900000, Actual Rate = 1.140845
Flow PIR = 1.000000, UBTM = 0.800000, Actual Rate = 0.676056

TABLE 8-continued

Flow PIR = 2.000000, UBTM = 0.200000, Actual Rate = 0.338028
Flow PIR = 1.000000, UBTM = 0.100000, Actual Rate = 0.084507
Total of actual rates = 3.000000

Scenario #8: With reference to Table 9, this scenario is the same as scenario 7, except that the link throughput has increased. Here some of the service flows reach their PIRs and some service flows do not. The service flows that don't reach their PIRs share the remaining bandwidth in proportion to the products of their PIR and UBTM values.

TABLE 9

Link Throughput = 5.000000
Flow PIR = 1.000000, UBTM = 0.900000, Actual Rate = 1.000000
Flow PIR = 1.500000, UBTM = 0.900000, Actual Rate = 1.500000
Flow PIR = 1.000000, UBTM = 0.800000, Actual Rate = 1.000000
Flow PIR = 2.000000, UBTM = 0.200000, Actual Rate = 1.200000
Flow PIR = 1.000000, UBTM = 0.100000, Actual Rate = 0.300000
Total of actual rates = 5.000000

Scenario #9: With reference to Table 10, this scenario is similar to scenario 8, but with different UBTM values and link throughput. In this case, only one of the service flows can transmit on the link at its PIR, while the remaining links share the bandwidth in proportion to the products of their PIR and UBTM values.

TABLE 10

Link Throughput = 4.000000
Flow PIR = 1.000000, UBTM = 1.000000, Actual Rate = 1.000000
Flow PIR = 1.500000, UBTM = 0.500000, Actual Rate = 1.285714
Flow PIR = 1.000000, UBTM = 0.400000, Actual Rate = 0.685714
Flow PIR = 2.000000, UBTM = 0.200000, Actual Rate = 0.685714
Flow PIR = 1.000000, UBTM = 0.200000, Actual Rate = 0.342857
Total of actual rates = 4.000000

While the above program code and code results are described in terms of a PIR in Mbps, the PIR can be expressed in other units. For example in a wireless link the maximum amount of data that could be carried on a service flow in one airlink frame can be used instead of the PIR expressed in Mbps.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention in which an exclusive property or privilege is claimed are defined as follows:

1. A data communications system comprising:
  at least one controller device configured to communicate with a plurality of client devices, each client device being capable of establishing a data communication link with the controller device;
  wherein the controller device is configured to:
  determine a usage based multiplier value for each client device based on an amount of data transferred using the data communication link of each client device during a first time period;
  monitor the data communication links of the client devices;
  adjust one or more usage based multiplier values of the client devices according to amounts of data transferred using the data communication links being monitored by the controller device during a second time period;
  apply a rate limiting scheme based on the usage based multiplier values if a congestion is detected in one or more of the data communication links, the rate limiting scheme including adjusting an allocation of available bandwidth to the client devices according to the usage based multiplier values of the client devices;
  determine if spare bandwidth exists on the data communication links after the rate limiting scheme has been applied; and
  allocate the spare bandwidth to one or more of the client devices;
  wherein the at least one controller device is further configured to determine a product of the usage based multiplier value and a peak information rate for each client device, and
  wherein the one or more of the client devices allocated with the spared bandwidth are those that are operating below their peak information rates,
  wherein allocating the spare bandwidth includes:
    determining the client device with the largest usage based multiplier value after the adjustment of the usage based multiplier value has been made;
    providing the spare bandwidth to the client device with the largest usage based multiplier to enable the client device with the largest usage based multiplier to operate at its maximum data transfer rate if the spare bandwidth is sufficient to provide the maximum data transfer rate to the client device with the largest usage based multiplier; and
    providing the spare bandwidth to each client device in proportion to the product of the usage based multiplier and the peak information rate associated with each client device if the spare bandwidth is insufficient to provide the maximum data transfer rate to the client device with the largest usage based multiplier.

2. The data communications system of claim 1, wherein the application of the rate limiting scheme further comprises determining the product of the usage based multiplier value and the peak information rate for each client device.

3. The data communications system of claim 1, wherein while spare bandwidth exists on the at least one data communications link, the spare bandwidth is allocated to the plurality of client devices sequentially, in accordance with the magnitude of their usage based multiplier values.

4. The data communications system of claim 3, wherein when it is determined that a client device in a sequence of client devices cannot be set to its maximum data transfer rate, the client device and a remainder of client devices in the sequence are allocated any spare bandwidth on the at least one data communications link in proportion to a magnitude of their usage based multiplier values and their peak information rate products.

5. The data communications system of claim 1, wherein the plurality of client devices comprise at least one wireless device that communicates with the at least one controller device through a wireless data communications link.

6. The data communications system of claim 1, wherein the plurality of client devices comprise at least one wireline device that communicates with the at least one controller device through a networked wireline data communications link.

7. A computer-implemented method for allocating bandwidth among a plurality of clients of a controller in a data communication system, each client being capable of establishing a data communication link with a controller, the computer-implemented method comprising:

providing a usage based multiplier for each of the clients based on an amount of data transferred using a data communication link of each client, the usage based multiplier being based on an amount of data transferred using the data communication link of each client during a first time period;

monitoring the data communication links of the clients;

adjusting the usage based multipliers of one or more clients according to amounts of data transferred using the data communication links of the one or more clients during a second period of time;

applying a rate limiting scheme based on the usage based multipliers if a congestion is detected in one or more of the data communication links, the rate limiting scheme including adjusting an allocation of available bandwidth to the clients according to the usage based multipliers of the clients;

determining if spare bandwidth exists on the data communication links after the rate limiting scheme has been applied; and allocating the spare bandwidth to one or more of the client devices;

determining a product of the usage based multiplier value and a peak information rate for each client device, wherein the one or more of the client devices allocated with the spared bandwidth are those that are operating below their peak information rates, wherein allocating the spare bandwidth includes:
    determining the client device with the largest usage based multiplier value after the adjustment of the usage based multiplier value has been made; and
    providing the spare bandwidth to the client device with the largest usage based multiplier to enable the client device with the largest usage based multiplier to operate at its maximum data transfer rate if the spare bandwidth is sufficient to provide the maximum data transfer rate to the client device with the largest usage based multiplier; and
    providing the spare bandwidth to each client device in proportion to the product of the usage based multiplier and the peak information rate associated with each client device if the spare bandwidth is insufficient to provide the maximum data transfer rate to the client device with the largest usage based multiplier.

8. The computer implemented method of claim 7, wherein applying the rate limiting scheme further comprises determining the product of the usage based multiplier and the peak information rate for each client.

9. The computer implemented method of claim 7, wherein while spare bandwidth exists on the at least one data communications link, the spare bandwidth is allocated to the clients sequentially, in accordance with the magnitude of their usage based multipliers.

10. The computer implemented method of claim 9, wherein when it is determined that a client in a sequence of clients cannot be set to its maximum data transfer rate, the client and a remainder of clients in the sequence are allocated any spare bandwidth on the at least one data communications link in proportion to a magnitude of their usage based multipliers and their peak information rate products.

11. A computer-implemented method for allocating bandwidth among a plurality of clients of a controller in a data communication system, each client being capable of establishing a data communication link with a controller, the computer-implemented method comprising:

assigning first and second usage based multipliers to first and second clients based on an amount of data transferred using first and second data communication links of the first and second clients, respectively, the usage based multiplier being based on an amount of data transferred using the data communication link of each client during a first time period;

monitoring the first and second data communication links of the first and second clients;

adjusting the first usage based multiplier of the first client if the first communication link of the first client has transmitted a greater amount of data during a second time period than during the first time period;

adjusting the second usage based multiplier of the second client if the second communication link of the second client has transmitted a lesser amount of data during the second time period than a the first time period;

thereafter, applying a rate limiting scheme based on the adjusted first and second usage based multipliers if a congestion is detected in one or more of the data communication links, the rate limiting scheme including adjusting an allocation of available bandwidth to the first and second clients according to the adjusted first and second usage based multipliers;

determining if spare bandwidth exists on the data communication links after the rate limiting scheme has been applied; and allocating the spare bandwidth to one or more of the client devices;

determining a product of the usage based multiplier value and a peak information rate for each client device, wherein the one or more of the client devices allocated with the spared bandwidth are those that are operating below their peak information rates, wherein allocating the spare bandwidth includes:
    determining the client device with the largest usage based multiplier value after the adjustment of the usage based multiplier value has been made; and
    providing the spare bandwidth to the client device with the largest usage based multiplier to enable the client device with the largest usage based multiplier to operate at its maximum data transfer rate if the spare bandwidth is sufficient to provide the maximum data transfer rate to the client device with the largest usage based multiplier; and
    providing the spare bandwidth to each client device in proportion to the product of the usage based multiplier and the peak information rate associated with each client device if the spare bandwidth is insufficient to provide the maximum data transfer rate to the client device with the largest usage based multiplier.

* * * * *